June 2, 1964

R. J. PIERCE 3,135,122

TUNING DIAL INDEX CALIBRATION

Filed Aug. 14, 1961

INVENTOR.
ROGER J. PIERCE
BY
Moody and Kintzinger
ATTORNEYS

United States Patent Office 3,135,122

Patented June 2, 1964

3,135,122
TUNING DIAL INDEX CALIBRATION

Roger J. Pierce, Cedar Rapids, Iowa, assignor to Collins Radio Company, Cedar Rapids, Iowa, a corporation of Iowa Filed Aug. 14, 1961, Ser. No. 131,145
4 Claims. (Cl. 74—10.8)

Figure 1:
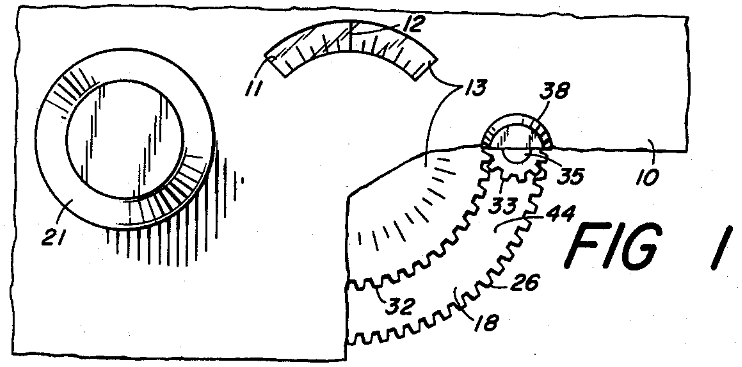

This invention relates to index calibration of tuning dials and in particular to apparatus for differentially rotating a dial on a tuning shaft for calibrating the dial to a fixed index in a panel dial window.

Many problems have been encountered with various systems used for calibrating tuning dials to a reference index. Dials on many receivers and transmitters employ a variable index movable on the front panel for calibration purposes. When the variable oscillator of a receiver or transmitter drifts from its original calibration, the index, with most movable index calibrating systems, must move from the vertical and be set at an angle. This can be disturbing to the operator of the equipment, particularly when the angle becomes large and may require that the dial be reset or slipped mechanically to restore the dial to a position on its shaft consistent with calibration to a vertically positioned index. Doing this usually involves considerable dismantling and the use of special tools. With multiband receiver and transmitter operation, it is not always possible to have the same index calibration for all operating bands. This is due to variations in crystal frequencies from the nominal value which would produce the same index calibration for all bands. When this condition exists mechanical resetting or slipping of the dial is of no avail.

It is, therefore, a principal object of this invention to provide for differentially moving a dial on its shaft for calibration to a fixed index in a dial window of a panel.

Another object is to provide for differentially moving a dial on its shaft from a front panel without any dismantling, and without requiring any special tools.

A further object is to provide means for position locking a tuning shaft and for simultaneously driving a dial, normally clutched for rotation with the shaft, in differential calibrating movement on said shaft.

Features in the accomplishment of these objects are the provision of a disk nonrotatably fixed on a tuning shaft, a dial mounted on said shaft for possible differential movement relative to said shaft, and means for clutching the dial for rotation with the shaft during normal tuning operation. The dial is positioned behind a window in an instrument panel in order that it may be read with respect to a vertical index printed on the window of the panel. Driving connections are provided from a tuning knob at the front of the panel to the tuning shaft. A calibrating device extends from a calibrating knob at the front of the panel to drive means which may be engaged with the dial, and to detent means which will simultaneously lock the disk and the tuning shaft, in order that differential calibrating movement relative to the shaft may be imparted to the dial.

A specific embodiment representing what is presently regarded as the best mode of carrying out the invention is illustrated in the accompanying drawing.

Figure 2:
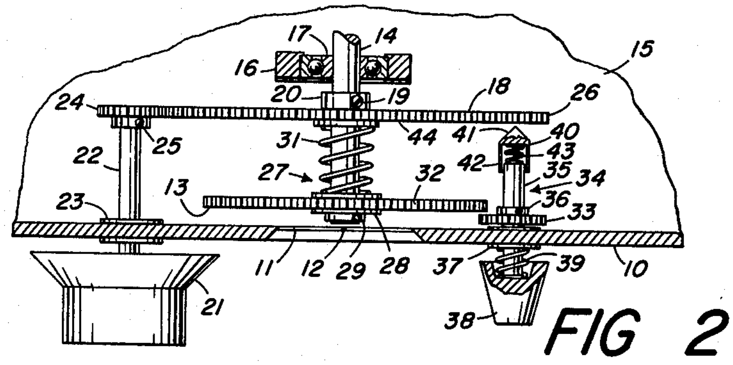
Figure 3:
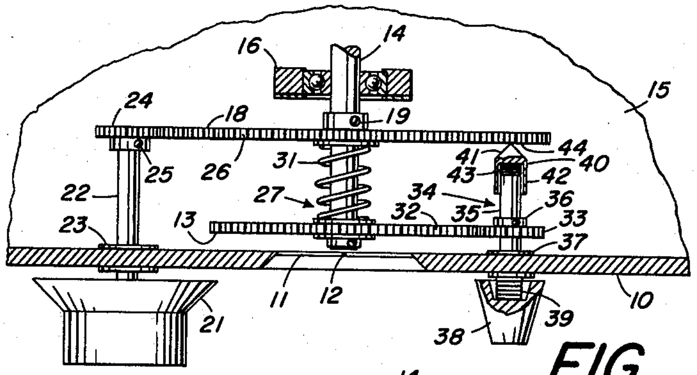
Figure 4:
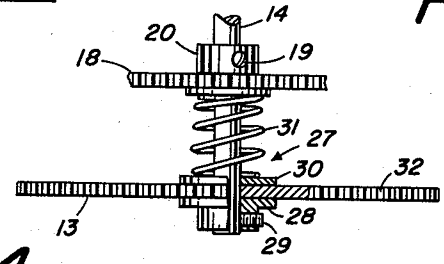

In the drawing:

FIGURE 1 represents a partial view of the front panel of a radio transmitter or receiver having a dial window and with the panel partially broken away to illustrate tuning dial calibrating apparatus;

FIGURE 2, a partial top view showing detail of the tuning dial calibrating arrangement;

FIGURE 3, a partial top view similar to FIGURE 2 with, however, a combination detent and dial calibrating device pushed into position for driving the dial in differential movement about its shaft for calibration relative to the index of a panel window; and FIGURE 4, a fragmentary view showing detail of the dial clutch mounting on its shaft.

Referring to the drawing:

Front panel 10 of a radio receiver or transmitter is equipped with a dial window 11 having a fixed vertical index 12. Dial 13, which is positioned behind window 11, is mounted on shaft 14 which, in turn, is mounted on radio chassis base 15 by mounting structure 16 and conventional bearing means 17. Disk 18, also mounted on shaft 14, is nonrotatably fixed on the shaft by a set screw 19 threaded through disk hub 20.

Tuning knob 21 is mounted on panel 10 with a shaft 22 extending through bearing 23. Gear 24 is nonrotatably fixed on shaft 22 of tuning knob 21 by set screw 25 in order that it will continuously engage gear teeth 26 provided on the outer periphery of disk 18. Thus, drive shaft 14, which is the drive shaft for a variable frequency oscillator (not shown) may be set at any time by turning tuning knob 21.

Dial 13 is mounted so that it may be differentially rotated relative to shaft 14. However, it is clutched to shaft 14 by clutch means, generally indicated by the number 27, in order that it will normally turn with shaft 14 as knob 21 is turned and the variable frequency oscillator is tuned. Clutch means 27, illustrated in detail in FIGURE 4, includes a clutch disk 28 nonrotatably fixed to shaft 14 by set screw 29, disk 30, and coil spring 31. Spring 31 is conveniently mounted on shaft 14 in a compressed state between the disk 18 and disk 30 to continuously resiliently bias dial 13 into clutching engagement with clutch disk 28.

Gear teeth 32 are provided on the outer periphery of dial 13 in order that gear 33 may be brought into driving engagement with the dial. Then when gear 33 is turned dial 13 is differentially driven on shaft 14 for recalibrating the position of the dial, on shaft 14, relative to the shaft index 12 in window 11. In order that this may be accomplished, a combination calibrating gear, detent, and knob device, generally indicated by the number 34, is provided.

Shaft 35, of device 34 and upon which gear 33 is nonrotatably fixed by set screw 36, is mounted for longitudinal and rotative movement relative to bearing 37 and front panel 10. Calibrating knob 38 which is fixed to shaft 35 at the front of panel 10 partially encloses coil spring 39 which is resiliently compressed between knob 38 and bearing 37 in order that the combination calibrating gear, detent, and knob device 34 will be continually biased toward the disengaged state illustrated in FIGURE 2. When it is desired to calibrate dial 13, knob 38 is pushed toward the front of panel 10 compressing spring 39 and displacing shaft 35 inwardly to bring gear 33 into engagement with the teeth 32 of dial 13 as shown in FIGURE 3.

Detent member 40 is provided with a pointed end 41 for locking disk 18 and shaft 14 in position as dial 13 is differentially driven relative to shaft 14 in opposition to the clutching force of clutch means 27. Detent member 40 also has a cylindrical shank 42 which conveniently encloses spring 43 and conveniently mounts the detent member 40 on the end of shaft 35.

Whenever knob 38 is pushed toward the front of panel 10 and shaft 35 is displaced longitudinally inwardly, the cylindrical shank 42 permits longitudinal movement of detent member 40 relative to the end of shaft 35 after pointed detent end 41 engages the forward face 44 of disk 18. When this occurs, spring 42 is resiliently compressed between the inner end of shaft 35 to resiliently maintain locking engagement of the detent member 40 with disk 18. When knob 38 is thereafter released shaft 35 is returned along with knob 38 back to the disengaged state shown in FIGURE 2 by spring 39. At the same time detent member 40 is moved longitudinally outwardly relative to shaft 35 until spring 43 is fully expanded as shown in FIGURE 2.

Bottoming of either spring 39 or spring 43 may be employed to establish the limit of longitudinally inward movement of shaft 35 and insure that gear 33 is in proper alignment for driving dial 32.

Obviously, as knob 38 is being pushed toward front panel 10 it may have to be turned slightly to bring the teeth of gear 33 into registry with teeth 32 for full driving engagement. It should also be readily apparent to those skilled in the art, that a tuning knob could be connected directly from the front of the panel to shaft 14, or any number of various drive arrangements could be used for turning shaft 14 in addition to the embodiment shown. With many such arrangements, gear teeth would not be required on the outer periphery of disk 18. However, many such other shaft 14 drive arrangements may be used with the index calibration means disclosed and still fall within the teachings of the present invention.

Whereas this invention is here illustrated and described with respect to a specific embodiment thereof, it should be realized that various changes may be made without departing from the essential contributions to the art made by the teachings hereof.

I claim:

1. An indicating dial mounted on a rotatably mounted tuning shaft behind a panel having a window with a fixed index, means interconnecting said dial and said tuning shaft and normally clutching said dial for rotation with said tuning shaft, a tuning knob, drive means interconnecting said tuning knob and said tuning shaft, and apparatus for index calibrating said indicating dial by differential movement of the dial relative to its shaft comprising normally disengaged dial driving means for driving said dial, and normally disengaged locking means arranged for position locking said tuning shaft simultaneously when the dial driving means is engaged; said apparatus for index calibrating the indicating dial including: a disk nonrotatably fixed on said tuning shaft, and comprising an axially and rotatably movable shaft and knob mounted on said panel; said normally disengaged dial driving means including gear teeth at the periphery of the dial, and a gear mounted on said movable shaft arranged for engaging and disengaging said gear teeth with axial movement of said movable shaft; said normally disengaged locking means being mounted on said movable shaft and being arranged for locking engagement with said disk for position locking said tuning shaft when said gear is engaging teeth of said dial.

2. The apparatus for index calibrating the indicating dial of claim 1 with said movable shaft and said knob being axially movable from an outward disengaged position to an interclutched and lock position, and means resiliently biasing said movable shaft and knob from the clutched and lock position to the disengaged position.

3. The apparatus for index calibrating the indicating dial of claim 1 wherein, said normally disengaged locking means comprises a detent member mounted on the inner end of said movable shaft, spring means between said detent member and the end of said movable shaft, and said detent member engaging the face of said disk and exerting resiliently biased locking force on said disk as the spring means is compressed by movement of said movable shaft toward the face of said disk as it is moved to the engaged position.

4. The apparatus for index calibrating the indicating dial of claim 1 wherein, the drive means interconnecting said tuning knob and said tuning shaft comprises a disk nonrotatably mounted on said tuning shaft, gear teeth on the outer periphery of said disk, a tuning knob shaft, and a gear nonrotatably mounted on said tuning knob shaft in driving engagement with the gear teeth of said disk.

References Cited in the file of this patent

UNITED STATES PATENTS

| | | |
|---|---|---|
| 2,470,482 | Gabrielson | May 17, 1959 |
| 3,089,088 | Roberts et al. | May 7, 1963 |

FOREIGN PATENTS

| | | |
|---|---|---|
| 452,964 | Canada | Nov. 30, 1948 |